United States Patent [19]

Olsen et al.

[11] Patent Number: 4,514,783
[45] Date of Patent: Apr. 30, 1985

[54] ENCAPSULATED, COMPRESSED-GAS-INSULATED, HIGH-VOLTAGE SWITCHING INSTALLATION

[75] Inventors: Willi Olsen; Heinz Padderatz; Joachim Palm; Christian Pircher, all of Berlin, Fed. Rep. of Germany

[73] Assignee: Siemens Aktiengesellschaft, Berlin and Munich, Fed. Rep. of Germany

[21] Appl. No.: 466,009

[22] Filed: Feb. 14, 1983

[30] Foreign Application Priority Data

Feb. 15, 1982 [DE] Fed. Rep. of Germany ... 8204536[U]

[51] Int. Cl.³ .......................................... H02B 11/14
[52] U.S. Cl. ............................ 361/336; 200/50 AA; 200/150 R
[58] Field of Search ................ 361/335–338; 200/50 AA, 50 R, 148 D, 150 J, 150 JA, 82 B

[56] References Cited

U.S. PATENT DOCUMENTS

| 1,866,365 | 7/1932 | Macneil | 361/337 |
| 1,885,365 | 11/1932 | Macneil | 361/337 |
| 1,944,092 | 1/1934 | Macneil | 361/337 |
| 2,039,028 | 4/1936 | Pierson | 361/336 |
| 2,914,627 | 11/1959 | Eichelberger et al. | 200/50 AA |
| 3,345,487 | 10/1967 | Strom | 200/150 R |
| 3,397,293 | 8/1968 | Darrow et al. | 200/50 AA |
| 3,405,325 | 10/1968 | Bruckner et al. | 361/336 |

FOREIGN PATENT DOCUMENTS 3014489 4/1980 Fed. Rep. of Germany ...... 361/336

Primary Examiner—A. D. Pellinen
Assistant Examiner—Gregory D. Thompson
Attorney, Agent, or Firm—Kenyon & Kenyon

[57] ABSTRACT

An encapsulated, compressed-gas-insulated, high-voltage switching installation is disclosed in which the circuit breaker is arranged horizontally in a pressure vessel having one end wall formed by a base plate to which are secured the interrupter units of the circuit breaker and all parts of the drive and arc extinguishing device, including the control unit and hydraulical accumulator. The base plate with the interrupter units and all parts of the drive and arc extinguishing device connected thereto can be moved as a structural unit on rollers connected to the base plate rolling on the installation ground or on a foundation, or lifted by a crane.

5 Claims, 2 Drawing Figures

ENCAPSULATED, COMPRESSED-GAS-INSULATED, HIGH-VOLTAGE SWITCHING INSTALLATION

BACKGROUND OF THE INVENTION

The present invention relates to an encapsulated, compressed-gas-insulated, high-voltage switching installation.

In the high voltage switching installation described in "Siemens Review", XLIII (1976) No. 5, pages 204 to 209, a tubular pressure vessel of electrically conductive material houses a circuit breaker having interrupter units disposed along a horizontal axis. The pressure vessel is located below other pressure vessels for the bus system. One end wall of the pressure vessel is formed by a base plate which can be withdrawn from the pressure vessel on rollers. The interrupter units are connected to the base plate on the side thereof facing the interior of the pressure vessel and are detachably connected to adjoining conductors. The outside of the base plate supports parts of the circuit breaker drive. The base plate is formed by the mounting plate for the circuit breaker drive housing in which is disposed a reversing drive for transmitting the motion of the piston in a vertically-disposed hydraulic cylinder to the switch contact of the interrupter units. The hydraulic cylinder is located below the drive housing and is connected thereto. The associated control unit is mounted on a separate movable platform and can be connected to the hydraulic units of the drive and to the circuit breaker housing via pipes and electric control lines. The drive energy for the circuit breaker is supplied by a hydraulic accumulator which is permanently installed under the circuit breaker. If inspection and servicing of the interrupter units of the circuit breaker are necessary, the oil pressure must be lowered, the connections leading to the control unit must be disconnected and the control unit must be removed. Only then can the drive housing and the interrupter units which from a structural unit be withdrawn from the pressure vessel of the circuit breaker after first opening screw connections to the bus systems. The structural unit is withdrawn on rollers fastened laterally to the base plate which roll on respective rails which are fastened laterally to the pressure vessel and extend horizontally beyond the pressure vessel to from a support frame for the structural unit. The interrupter units remain on the support frame after they have been pulled out and are readily accessible. However, the circuit breaker is not mechanically operable and loses its ability to extinguish arcs when the connection between the hydraulic accumulator/hydraulic cylinder, and the control unit of the drive has been opened.

OBJECT AND SUMMARY OF THE INVENTION

It is an object of the present invention to simplify handling of the circuit breaker in an encapsulated, compressed-gas-insulated, high-voltage switching installation of the type described above so that installation and servicing thereof can be facilitated and performed more cost-effectively and in less time.

The above and other objects are achieved by the invention disclosed herein which provides an encapsulated, compressed-gas-insulated, high-voltage switching installation of the type described above having a base plate which supports all parts of the interrupter units, the arc extinguishing device and the drive system for the circuit breaker, including a control unit and a hydraulic accumulator, and which can be moved on rollers rolling on the ground or on a foundation, or moved suspended from a crane. The interrupter units of the circuit breaker are therefore moved together as a structural unit with all drive, supply and control devices required for operating the switch contacts of the circuit breaker, and are removed from the pressure vessel by means of the rollers rolling over the ground or on a foundation, or by a crane of sufficient capacity which is advantageously permanently located at the switching installation. Thereby, the interrupter units remain mechanically fully operable and can be checked and switched mechanically when withdrawn from the circuit breaker, and even when separated from the circuit breaker and removed, for example, to a testing facility. A separate support device, whose movement in the switching installation room after withdrawal could be limited, is not necessary. According to the invention, the base plate which also forms the end wall of the pressure vessel is freely movable in the switching installation room and supports all drive, supply and control elements mounted thereon as a structural unit. To remove the base plate, it is only necessary to open the connections to the power supply and the field and system controls via electrical connectors.

According to an aspect of the invention, at least three rollers are detachably fastened to the base plate so that a vertical line extending through the center of gravity of the structural unit to be moved is located within the area defined by the rollers. Thereby, the rollers are sufficiently separated from each other and from the base plate to stabilize the position of the structural unit, the center of gravity of which is located approximately in the plane of the base plate, and to prevent tilting. Since the rollers are detachably mounted to the base plate, they can be removed from the base plate after completion of installation or servicing so that one set of rollers is sufficient for a high-voltage switching installation with several circuit breakers. The rollers are preferably adjustable in height to facilitate adapting the unit being moved to existing space conditions.

The above and other objects, features, aspects and advantages of the invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which.

DESCRIPTION OF THE PREFERRED EMBODIMENT

Figure 1:
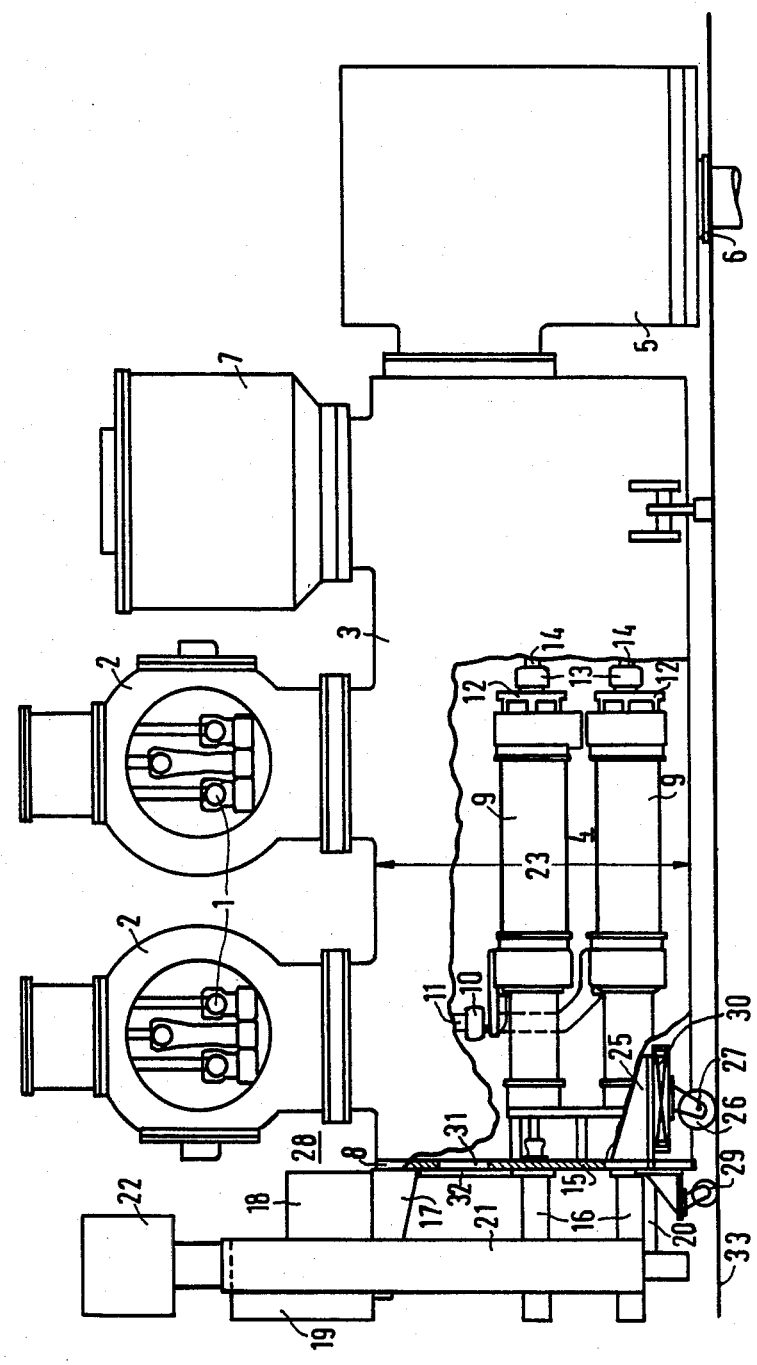
FIG. 1 is a side view of a compressed-gas-insulated, high-voltage switching installation according to the invention in which are encapsulated three poles, with the pressure vessel of the circuit breaker being shown broken-away.

The compressed-gas-insulated, high-voltage switching installation depicted in FIG. 1 encapsulates three poles and includes a cable termination section insulated with SF$_6$ gas connected to two bus bar systems 1. Each bus bar system 1 is arranged with corresponding disconnect switches in a pressure vessel 2 which is supported by a main tubular pressure vessel 3 disposed below the pressure vessels 2. In the pressure vessel 3 are disposed a circuit breaker 4 extending along a horizontal axis, grounding switches, a current transformer and conductors leading to adjacent panel sections (not shown).

A pressure vessel 5 is arranged adjacent to vessel 3 along the longitudinal axis thereof. In the interior of the pressure vessel 5 are disposed terminal parts together with disconnect and grounding switches (not shown) for making connection to an output cable 6. The pressure vessel 3 further supports a pressure vessel 7 in which is disposed a voltage transformer.

With reference to FIG. 1, the left end face of the pressure vessel 3 is closed off by a base plate 8. Fastened to the base plate 8 are three horizontally-disposed interrupter units 9 of the circuit breaker 4 which are connected via screw connections to the conductors 11 leading to the bus bar systems 1. At the end face 12 of the interrupter units, plug connections 13 are provided which can be closed via a terminal 14 and which establish respective connections to the current transformer or the cable connection.

To the outside 15 of the base plate 8 are fastened horizontally-disposed hydraulic cylinders 16 which are freely accessible from the outside of the pressure vessel 3. The hydraulic cylinders 16 are brought through the base plate 8 and are connected to respective interrupter units 9. The switch contacts depicted in FIG. 1 of the hydraulic cylinders actuate respective interrupter units. To the base plate 8 is further fastened an upper support bracket 17 which supports all the hydraulic units 18 required for operating the circuit breaker 4, including the control unit 19, the hydraulic accumulator 21 and the hydraulic oil tank 22 disposed on top of accumulator 21. The accumulator 21 is vertically arranged and because of its length is also supported by a lower support 20. The hydraulic accumulator supplies the drive energy required for operating the interrupter units 9 of the circuit breaker 4.

The base plate therefore is the sole supporting element for the interrupter units of the circuit breaker and all parts of the drive and quenching system therefor including the control unit and hydraulic accumulator. Thus, a structural unit 28 is formed by the interrupter units 9, the base plate 8, the hydraulic cylinders 16, the hydraulic units 18, the control unit 19, the hydraulic accumulator 21 and the oil tank 22.

Figure 2:
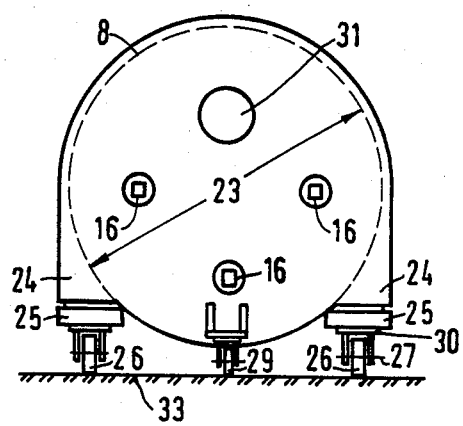
FIG. 2 is a front view of the base plate of the pressure vessel of FIG. 1 showing the rollers fastened thereto, and with the drive, supply and control devices being omitted.

The base plate 8 is larger than the diameter 23 (FIG. 2) of the tubular pressure vessel 3. The lower half of the base plate 8 is provided with lateral extensions 24 to which supports 25 for lateral rollers 26 are fastened. The horizontal axes 27 of the rollers are disposed behind the base plate 8 such that the rollers 26 are laterally located under the tubular part of the pressure vessel 3. In addition, a middle roller 29 is positioned in front of the outside 15 of the base plate 8 and is generally centered with respect to the base plate 8. The distance between the base plate 8 and the middle roller 29, and the distance between the base plate 8 and the lateral rollers 26, as well as the distances between rollers are chosen so that a vertical line going through the center of gravity of the structural unit 28 is located within the area bounded by the lateral rollers 26 and the middle roller 29. This stabilizes the structural unit 28 and prevents toppling when the structural unit 28 is removed from the pressure vessel 3.

The lateral rollers 26 and the middle roller 29 are detachably fastened to a respective support 25 and the base plate 8, respectively, so that the rollers 26 and 29 can be taken off the base plate 8 after installation or completion of servicing. The rollers can thus be used for the structural unit 28 of another switching panel section having a horizontal circuit breaker 4 in another pressure vessel 3.

The rollers are provided with height adjustment devices to allow the height of the structural unit to be adjusted. A height adjustment device 30 of the adjustable inclined plane is provided in the supports for the rollers 27, while the more easily accessible middle roller 29 can be adjusted in height for example, by threaded bolts. Means such as hooks or lugs can be fastened to the base plate for lifting it with a crane.

A central manhole 31 is provided in the base plate 8 above the interrupter units 9 for providing access to the screw connections 10 between the connecting lines 11 to the bus systems and to the interrupter units 9 located in the interior of the pressure vessel 3. The drive, supply and control system of the structural unit 28 which are located on the outside of the base plate 8 are arranged so that the manhole 31 is freely accessible from the outside 15 and can be closed off by an installation cover 32.

The movable structural unit 28, the main support element of which is formed by the base plate 8, thus contains all interrupter units 9 of the circuit breaker 4 and the drive, supply and control devices required for actuating its contacts. After the plug connections of the structural unit 28 for the power supply and the field and system control are opened and the screw connections 10 are opened via access through the manhole 31, and after the fastening means of the base plate 8 at the pressure vessel 3 are disconnected, the structural unit 28 can be withdrawn in a very simple manner from the pressure vessel 3, and is then freely movable relative to the latter, since the rollers 26, 29 roll on the ground or a foundation 33 of the high-voltage switching installation. The interrupter units are thus freely accessible for inspection or maintenance work. Furthermore, it is possible to test the structural unit in a testing facility after the appropriate testing connections have been made since the interrupter units 9 of the circuit breaker 4 are mechanically operable.

Certain changes and modifications of the disclosed embodiments of the present invention will be readily apparent to those skilled in the art. It is the applicants' intention to cover by their claims all those changes and modifications which could be made to the embodiments of the invention herein chosen for the purpose of disclosure without departing from the spirit and scope of the invention.

What is claimed is:

1. In an encapsulated, compressed-gas-insulated, high-voltage switching installation comprising a main pressure vessel of electrically conductive material, a circuit breaker which includes interrupter units with an arc extinguishing device and a hydraulic drive for operating the interrupter units, a vertically extending base plate closing off one end of the pressure vessel, said interrupter units being horizontally disposed in the pressure vessel and fastened to the base plate on the side facing the interior of the pressure vessel and being detachably connected to adjoining conductors and parts of said drive being fastened on the outside of the base plate, the improvement comprising the base plate supporting all parts of the interrupter units, the arc extinguishing device and the drive, including a control unit and a hydraulic accumulator, as a structural movable unit, the base plate including at least three rollers detachably connected thereto for rolling on the ground or a foundation, at least one of said rollers being disposed on one side of said base plate and at least one other of said rollers being disposed on an opposite side of said base plate, thereby defining a wheel base extending from said one side of said base plate horizontally to said opposite side of said base plate, said interrupter units extending horizontally substantially beyond said wheel base on said one side of said base plate, said control unit and said accumulator extending on said opposite side of said base plate beyond said wheel base, said wheel base having an area and said interrupters, said arc extinguishing device and said drive, including said control unit and said accumulator, being so disposed that a vertical line going through the center of gravity of the structural unit is located within the area bounded by the rollers.

2. The combination according to claim 2 wherein the improvement further comprises a middle roller located to the front of the base plate and two lateral rollers located to the rear of the base plate.

3. The combination according to claim 2 wherein the improvement further comprises means for adjusting the height of the structural unit.

4. The combination according to claim 1 wherein the improvement further comprises a central manhole which can be closed by a cover disposed in the base plate above the interrupter units, the parts of the drive and control unit being located on the outside of the base plate and arranged so that the manhole is freely accessible from the outside.

5. The combination according to claim 1 wherein said rollers are located totally outside of the pressure vessel.

* * * * *